United States Patent

[11] 3,581,474

[72] Inventor Roger F. Kent
    Mount Prospect, Ill.
[21] Appl. No. 815,820
[22] Filed Apr. 14, 1969
[45] Patented June 1, 1971
[73] Assignee National Dust Collector Corporation
    Skokie, Ill.

[54] GAS SCRUBBER
    19 Claims, 12 Drawing Figs.

[52] U.S. Cl. ............................................. 55/226,
    55/233, 55/238, 55/257, 55/260, 55/358, 55/394,
    55/418, 55/426, 55/432, 55/435, 55/436, 55/448,
    55/452, 55/457, 55/483, 55/484, /, /, 261/23,
    261/112, 261/116
[51] Int. Cl. .......................................... B01d 47/06
[50] Field of Search ................................. 55/233,
    237, 240, 241, 257, 457, 226, 238, 260, 358, 394,
    418, 426, 432, 435, 436, 448, 452, 483, 484;
    261/23, 109, 111, 112, 116

[56] References Cited
    UNITED STATES PATENTS

| | | | |
|---|---|---|---|
| 885,185 | 4/1908 | Serrell | 55/257 |
| 912,686 | 2/1909 | Keeney | 55/435 |
| 963,832 | 7/1910 | Tiemann | 55/257X |
| 1,139,053 | 5/1915 | Murray et al. | 261/112X |
| 1,674,764 | 6/1928 | Dauphinee | 261/112 |
| 1,751,999 | 3/1930 | Hines | 55/241 |
| 1,784,627 | 12/1930 | Hamill | 55/423X |
| 1,899,017 | 2/1933 | Dauphinee | 261/112 |
| 2,045,519 | 6/1936 | Coutant | 55/257X |
| 2,199,632 | 5/1940 | Keyes | 55/483X |
| 3,251,176 | 5/1966 | Gleason | 55/455X |
| 3,488,039 | 1/1970 | Ekman | 261/81 |

FOREIGN PATENTS

| | | | |
|---|---|---|---|
| 442,410 | 3/1927 | Germany | 55/418 |

Primary Examiner—Dennis E. Talbert, Jr.
Attorney—Mason, Kolehmainen, Rathburn and Wyss ABSTRACT: A gas scrubber comprising a housing having an inlet and an outlet for gas, and a grid structure dividing said housing between said inlet and outlet and having an inlet side and an outlet side. The grid structure includes a support frame and one or more grid assemblies removably mounted thereon, each grid assembly employing a plurality of parallel grid elements. Wetting means is provided for introducing a contaminant-collecting scrubbing liquid on the inlet side of the grid structure onto the grid elements for intimate mixing with the gas and flow therewith through the passages between the grid elements, and separator means is provided for removing contaminated scrubbing liquid from the gas after passage through the grid structure.

PATENTED JUN 1 1971

Inventor
ROGER E. KENT
by Mason, Kolehmainen, Rathburn and Wyss
Attorneys

Inventor
ROGER E. KENT
by Mason, Kolehmainen, Rathburn and Wyss
Attorneys.

PATENTED JUN 1 1971

Inventor
ROGER E. KENT
by
Mason, Kolehmainen,
Rathburn and Wyss.
Attorneys

GAS SCRUBBER

The present invention relates to gas scrubbers, and more particularly relates to wet scrubbers of the gas-liquid contact type wherein a contaminant-collecting scrubbing liquid is introduced into the gas to remove and collect contaminant particles and fume.

It is an object of the present invention to provide a new and improved gas scrubber which is highly efficient in collecting and removing contaminant particles and fume from industrial gases and the like.

Another object of the present invention is to provide a new and improved gas scrubber of the type described having new and improved means for agglomerating, collecting, and removing from the gas a high percentage of the contaminant particles contained therein, both large and small in size.

Another object of the present invention is to provide a new and improved gas scrubber of the character described which is capable of efficiently collecting and removing contaminant particles from the gas with a minimum of energy expended and a minimum of scrubbing liquor being required.

Another object of the present invention is to provide a new and improved gas scrubber of the character described having improved means for removing contaminated scrubbing liquid from the cleansed gas.

Another object of the present invention is to provide a new and improved gas scrubber of the character described which is extremely efficient in operation and capable of removing a high percentage of the contaminant particles ranging in size from 10 microns on down.

Another object of the present invention is to provide a new and improved gas scrubber of the character described employing a new and improved means for intimately mixing the scrubbing liquid and the gas.

Another object of the present invention is to provide a new and improved gas scrubber of the character described including a wall structure having one or more grid assemblies removably mounted thereon and including new and improved means for introducing finely divided droplets of scrubbing liquid into the gas flow passing through the openings in the orifice plate.

Another object of the present invention is to provide a new and improved gas scrubber which can be readily set up to provide efficient operation for many different kinds of gases which may contain particles of different size ranges.

Another object of the present invention is to provide a new and improved gas scrubber which can be set up to operate in a highly efficient manner over a wide range of gas flow rates.

Another object of the present invention is to provide a new and improved gas scrubber which is easily maintained and is designed so that the grid structure therein is readily accessible for service and replacement of components.

Still another object of the invention is the provision of a new and improved gas scrubber employing a grid structure having one or more separate grid assemblies mounted thereon, which assemblies are readily removable from the supporting structure for replacement or cleaning.

Still another object of the present invention is to provide a new and improved gas scrubber which does not require the use of a relatively thick, difficult-to-clean filter medium or bed.

Another object of the present invention is to provide a new and improved gas scrubber which requires a minimum quantity of scrubbing liquid per unit volume of gas that is cleaned yet is extremely efficient in removing the contaminants in the gas over a wide range of particle size.

These and other objects and advantages of the present invention are accomplished in an illustrated embodiment which comprises a gas scrubber including a housing having an inlet and an outlet. A grid structure is provided for dividing the housing between said inlet and outlet, and the grid includes an inlet side and an outlet side and a support frame. One or more grid assemblies is removably mounted on the support frame, each assembly comprising a plurality of parallel, spaced-apart, elongated grid elements. Wetting means is provided for introducing a contaminant-collecting scrubbing liquid on the inlet side of the grid structure onto the grid elements for intimate mixing with the gas and flow therewith through the spaces between the grids. New and improved separator means is provided for removing the contaminated scrubbing liquid from the gas after passage through the grid structure. The gas scrubber of the present invention is extremely efficient in agglomerating, collecting, and removing contaminant particles, including those ranging in size form 10 microns on down, and yet requires a minimum amount of power and scrubbing liquid per unit volume of gas being handled.

For a better understanding of the present invention, reference should be had to the following detailed description taken in conjunction with the drawings, in which.

Referring now, more particularly, to the drawings, therein is illustrated a new and improved gas scrubber 20 constructed in accordance with the features of the present invention and especially adapted for the efficient removal of contaminant particles and fume from industrial gases and the like. The contaminated gas to be cleaned is introduced into the scrubber through an inlet elbow 22 for downward discharge through a vertical duct section 24 into an inlet chamber 26 on the inlet side of an upstanding grid structure, generally indicated as 28, which structure divides an elongated, horizontal lower housing section 30 FIGS. 1 and 2) between the inlet chamber 26 and an outlet chamber 32 adjacent the opposite or outlet side of the upstanding grid structure.

Figure 1:
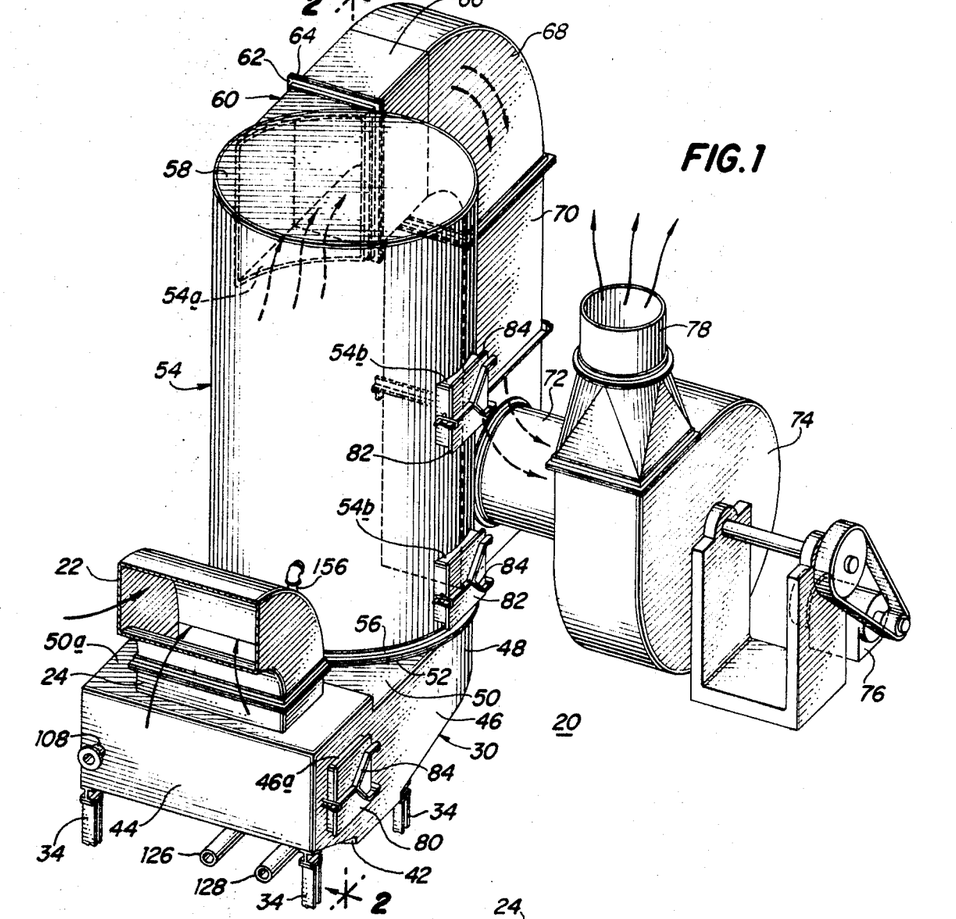
FIG. 1 is a perspective view of a new and improved gas scrubber constructed in accordance with the features of the present invention.
Figures 2, 8, 9:
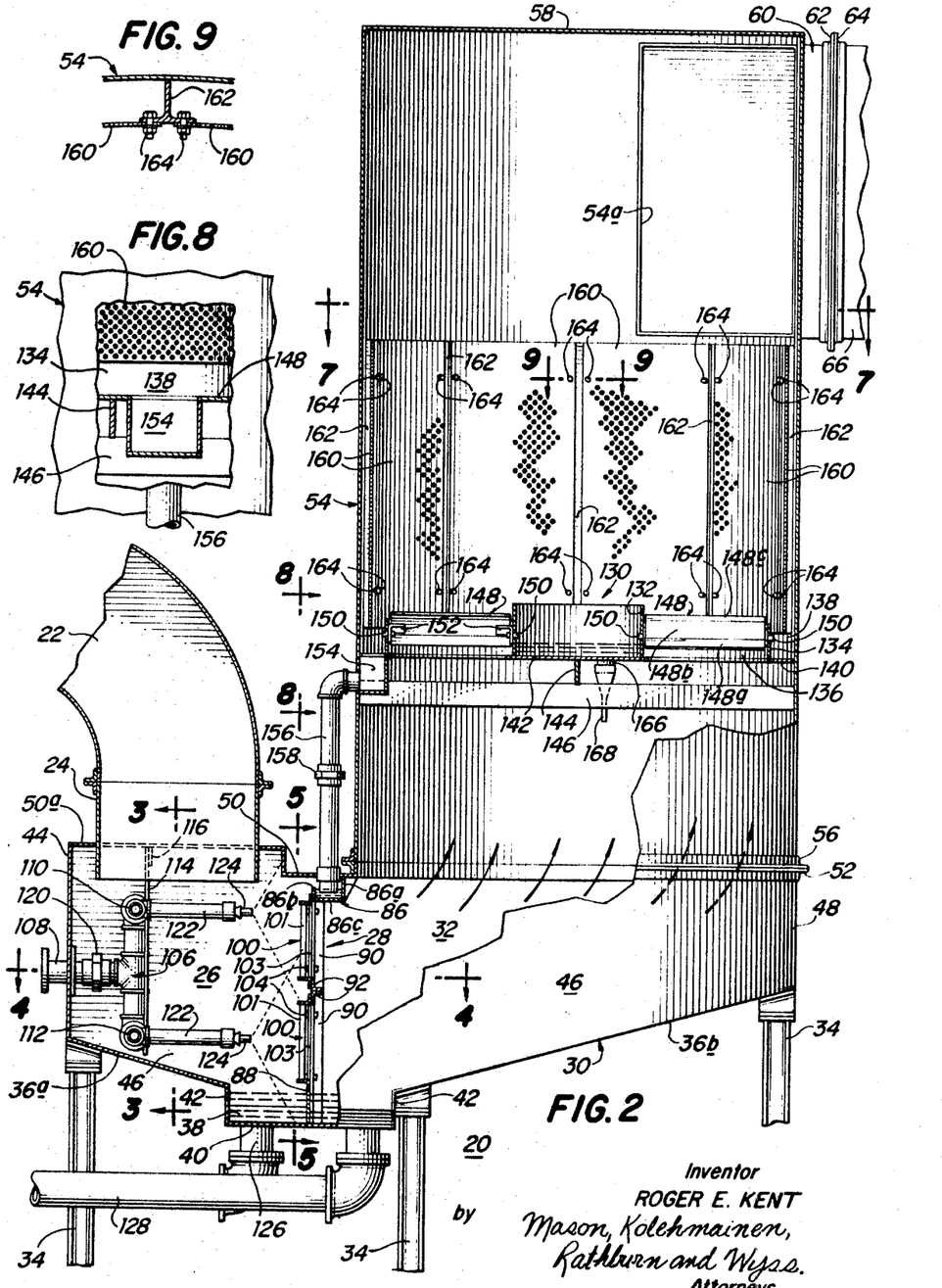
FIG. 2 is a vertical sectional view taken substantially along line 2-2 of FIG. 1.
FIG. 8 is an enlarged fragmentary elevational view with portions broken away looking in the direction of arrows 8-8 of FIG. 2.
FIG. 9 is an enlarged, fragmentary sectional view taken substantially along line 9-9 of FIG. 2.

The lower, horizontally extending section 30 is supported on a plurality of legs 34 FIGS. 1 and 2) which are attached to the underside of bottom wall panels 36a and 36b which slope downwardly toward the center of the housing section from opposite ends and are joined to the opposite sidewalls 42 of a troughlike structure 40, which forms a liquid-collecting sump 38 along the lower edge of the upstanding grid structure 28. The liquid in the sump 38 forms a liquid seal at the bottom of the housing along the lower edge of the grid structure and the seal prevents a back flow of gas between the inlet chamber 26 and outlet chamber 32.

The housing section 30 includes a front wall 44 forming the outside wall of the inlet chamber 26 and a pair of longitudinal sidewalls 46 which are integrally joined at the right-hand end of the housing section (FIG. 2) by a wraparound, cylindrical segment 48 forming the opposite end of the chamber. The lower housing section also includes a top wall 50 having an elevated portion 50a adjacent the inlet chamber 26, and the inlet duct 24 extends downwardly into the inlet chamber through a rectangular opening formed in the elevated wall section 50a. The gases to be cleaned enter the lower housing section from the upper left-hand end thereof above the inlet chamber 26 and pass in a generally horizontal flow through passage between the grids in the structure 28 and into the outlet chamber 32.

The top wall 50 of the lower housing section is provided with a circular opening at the right-hand end which is encircled by an angle flange 52, which flange provides support for a cylindrical, vertical housing section 54. The cylindrical housing section 54 is provided with an angular annular flange 56 at the lower end thereof, which is bolted or otherwise secured to the flange 52 on the lower housing section 30, and the upper cylindrical housing section can be disconnected and separated from the lower housing section when desired.

The upper end of the cylindrical housing section is closed by a circular top wall 58 and clean gases are discharged from the scrubber through a rectangular-shaped discharge opening 54a in the wall 54 through an outlet boot assembly 60 having an outer end flange 62 adapted to be connected to the flange 64 on a short duct section 66.

Scrubbed gases from the gas scrubber 20 are withdrawn from the upper end of the cylindrical housing section 54 through the outlet boot fitting 60 and flow out through the short duct section 66 and are then turned downwardly through an elbow duct 68 into a vertical downtake duct section 70. The cleansed gases are withdrawn from the lower end of the downtake duct 70 through a cylindrical fan inlet duct 72 connected to an axial inlet opening in the side of a centrifugal fan 74 which is driven by an electric motor 76 or other prime mover. The gases are discharged from the outlet of the fan 74 into an exhaust stack 78 or other duct for recirculation of the cleansed gases. The fan 74 provides motive power for circulating the gases through the scrubber 20 and, while shown on the outlet side of the system, the fan could also be used on the inlet side for accomplishing the same purpose.

Figure 3:
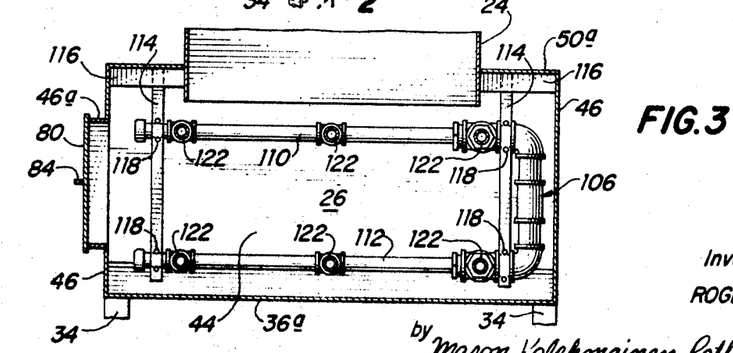
FIG. 3 is a vertical sectional view taken substantially along line 3-3 of FIG. 2.
Figures 4, 6:
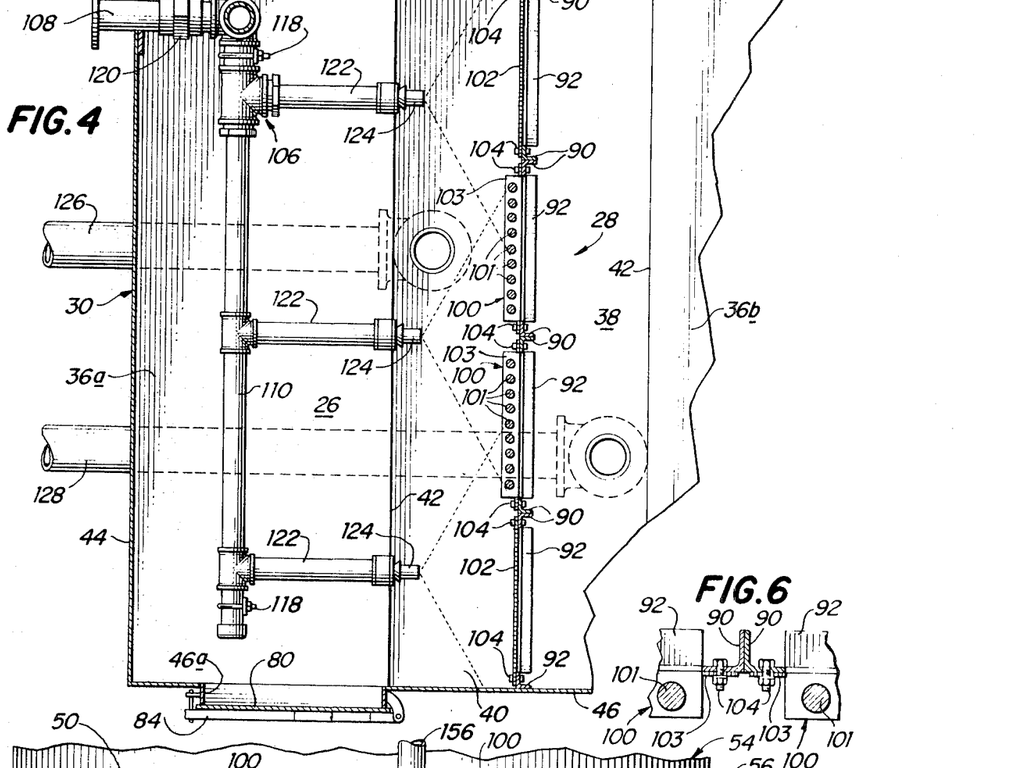
FIG. 4 is a horizontal sectional view taken along line 4-4 of FIG. 2.
FIG. 6 is an enlarged fragmentary sectional view taken substantially along line 6-6 of FIG. 5.

Access to the interior of the inlet chamber 26 and the inlet side of the upright grid structure 28 is provided by an access door 80 (FIGS. 1 and 3) which is mounted on one of the chamber sidewalls 46. The door 80 cooperates with a flanged opening 46a formed in the sidewall, and when the door is unlatched and opened service personnel are afforded ample access to the interior of the housing section 30 on the inlet chamber side of the grid structure 28. Access to the upper, cylindrical housing section 54 is provided through a pair of vertically spaced, flanged openings 54a and access doors 82. When closed, the doors 80 and 82 form gastight seals around the flanged openings 46a and 54a, so that no gas leakage occurs and each door is provided with a conventional pivotal support and latching mechanism 84, as illustrated in FIGS. 1 and 6.

Figure 5:
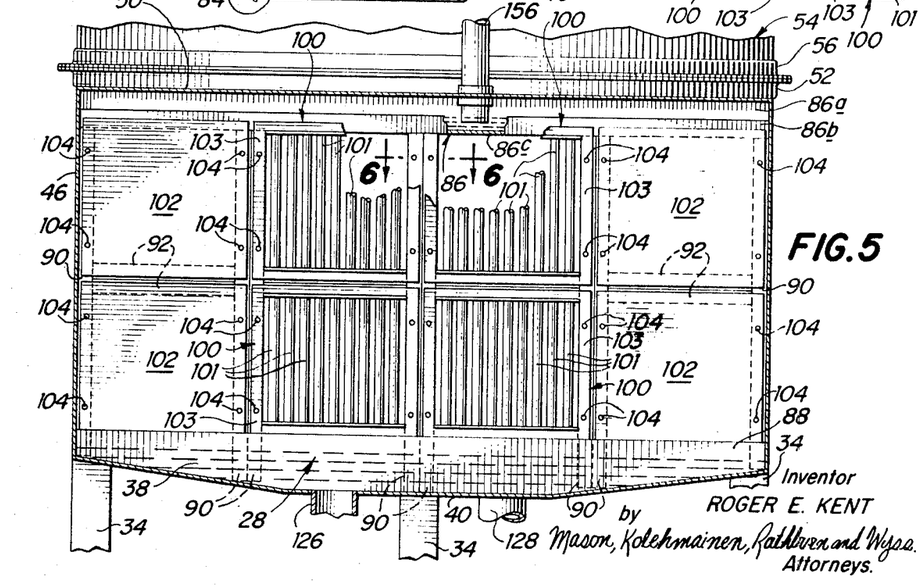
FIG. 5 is a vertical sectional view taken substantially along line 5-5 of FIG. 2.

In accordance with the present invention, the grid structure 28 includes a framework or support frame having a channel-shaped trough member 86 along the upper edge, and, as best shown in FIG. 2, the upper edge of one upright flange 86a of the channel is welded or otherwise sealed to the underside of the top wall 50. The opposite flange 86b of the channel on the inlet side of the grid structure is shorter in vertical dimension and the upper edge is spaced below the underside of the top wall 50 of the housing. Liquid collects in the channel-shaped trough 86 and cannot pass into the outlet chamber 32 because of the flange 86a, but when the liquid level reaches the upper edge of the opposite flange 86b, liquid begins to spill over the flange and run downwardly on the inlet side of the grid structure. The channel includes a web 86c forming the bottom of the liquid collecting trough and, once the liquid reaches a level even with the upper edge of the flange 86b, any additional liquid added flows over the edge of the flange and downwardly therefrom, wetting the inlet side of the grid structure. The grid structure includes a lower crossmember 88 (FIGS. 2 and 5) which extends transversely across the housing and divides the liquid sump 38 into two parts on opposite sides thereof, as shown in FIG. 5. The liquid which collects in the sump forms a liquid seal so that no backflow of gas between the inlet chamber 26 and the outlet chamber 32 occurs along the bottom of the dividing grid structure 28. The support framework includes a plurality of vertical angle members 90, pairs of which are disposed with flanges in back-to-back relation at spaced intervals across the lateral width of the lower housing section 30. At the outer edges adjacent the sidewalls 46, single angle members 90 are provided and flanges of the angles are welded or otherwise secured in a gastight sealing relation against the inside surface of the adjacent housing sidewalls 46.

The upper ends of the angles 90 are joined to the web 86c of the channel member 86 while the lower end portions of the angles are welded or otherwise secured to the bottom divider plate 88. Pairs of short horizontal angles 92 with flanges back-to-back are disposed to extend between adjacent pairs of spaced vertical angles 90 at a level intermediate the channel 86 and divider plate 88, and the angles 90 and 92 form a framework for supporting a plurality of separate grid assemblies 100, each assembly including a plurality of spaced-apart, parallel, elongated grid elements 101. The elongated grid elements 101 may take the form of hollow tubes or solid rods and are supported in a rectangular or square frame member 103 formed of angle iron. The diameter of the elements and the spacing between adjacent elements is set up to provide the desired velocity range required for best separation efficiency. The gas and scrubbing liquid flows at a high velocity through the spaces or slots between the grid elements 101 from the inlet chamber 26 to the outlet chamber 32 of the lower housing section 30 and, in the regions immediately adjacent opposite sides of the elements and between adjacent pairs of elements, intense mixing of the gas molecules and liquid droplets is obtained with a highly turbulent flow pattern obtaining.

In one physical embodiment of the present invention, the elements 101 were constructed of stainless steel tubing 1 inch in diameter having a wall thickness of 1/16 inch and spaced on 1⅝ inch centers. The tubes were arranged in a vertical plane as shown, and the resultant spacing or slots between tubes provides for a gas flow area comprising about 40 percent of the total area of the grid assembly 100. As shown in FIG. 5, the supporting frame structure of the illustrated embodiment comprising the members 86, 88, 90, and 92 provides spaces for a maximum of eight square or rectangular-shaped separate grid assemblies 101; however, depending on the operating conditions desired, any number of grid assemblies up to a maximum of eight can be used in combination with solid blocking plates 102 to establish a particular gas flow area as needed for a given volume flow rate application. As will be more fully discussed hereinafter, the maximum velocity of the gas and liquid flowing through the slots or spaces between elements 101 in the grid assemblies 100 is dependent upon the pressure difference between the chambers 26 and 32 and the number of grid assemblies and area size of the slots or spaces in each grid assembly. By adjusting any of these factors, the velocity of the gas and liquid flow through the grid structure 28 can be increased or decreased as desired. It is to be understood that the tube or rod diameter and the spacing and arrangement of the elements 101 in each grid assembly 100 can vary and, in addition, the number of grid assemblies 100 in relation to blocking plates 102 on a given size grid structure 28 can be changed to provide a wide range of flow velocity; for example, the grid structure shown has spaces for a maximum of eight grid assemblies 100 but only the four centrally located spaces are provided with grid assemblies, and the outside spaces on either side are blocked off or covered with two pairs of blocking plates 102. Because four grid assemblies and four blocking plates, rather than all are used, the collective flow area of all of the slots or passages in the grid structure 28 through which the gases must flow is reduced by one half and the gas velocity is thereby doubled. If only a single grid assembly 100 were used in combination with seven blocking plates 102, an extremely high flow velocity through the passages or slots between elements 101 is obtained, and this velocity could be further increased by reducing the number and size of the slots or passages in the single grid assembly. On the other hand, if all eight of the spaces in the grid support structure are covered by grid assemblies 100 and no blocking plates 102 are used, the gas velocity is reduced and a further decrease in velocity could be obtained by decreasing the size or diameter of the elements 101 and increasing the spacing between elements.

The grid assemblies 100, as well as the blocking plates 102 are adapted to be easily removed and mounted on the grid support framework by means of bolts or studs and nuts 104 (FIG. 6). Consequently, it is a relatively simple task to set up a different flow area for producing a desired change in gas velocity and, in the event a grid assembly 100 becomes plugged or begins to deteriorate because of corrosion or other chemical action, it can be individually replaced, independent of the other grid assemblies 100 or blocking plates 102 on the structure 28.

From the description thus far, it will be seen that scrubbing liquid collected in the channel trough 86 extending along the upper edge of the grid structure 28 is dispensed downwardly on the inlet chamber side of the grid assemblies 100, and the high-velocity gas flowing through the passages or slots between grid elements 101 picks up this moisture by entrainment and venturi action. It is believed that the intense high-velocity flow and extreme turbulence in and around the vicinity of the grid elements 101 cause finely divided droplets of liquid to be literally torn away from the liquid supplied to the inlet chamber side of the grid structure 28, and these liquid droplets are mixed with the gas to agglomerate and collect the contaminant particles and fume in the gas. The flow adjacent and through the slots or passages between elements 101 is extremely turbulent and is at a relatively high velocity, so that excellent mixing or blending of the minute droplets (usually water) of scrubbing liquid with the gas occurs. The contaminant particles and fume in the gas come in close and repeated direct contact with the finely divided droplets of scrubbing liquid and the contaminants agglomerate and are entrapped within the liquid. Because of the high velocity, turbulent flow that literally tears the liquid droplets into smaller ones, better blending of the smaller sized contaminant particles (2 microns and lower) and the liquid droplets is obtained and collection efficiencies of particles in the smaller size ranges are increased.

In addition to the scrubbing liquid from the channel 86, which is dispensed onto the inlet side of the grid structure 28 forming a liquid film on the elements 101, scrubbing liquid is also introduced into the inlet chamber 26 through a spray manifold 106 connected to a short conduit 108, which extends outwardly through the front wall 44 of the lower housing section 30. The spray manifold 106 includes upper and lower horizontal branches or trunks 110 and 112, as shown in FIG. 3, supported by a pair of vertical braces 114 suspended from ribs 116 on opposite sides of the inlet duct 24 adjacent the elevated top wall 50a of the housing section. Removable U-bolt assemblies 118 (FIG. 3) are used for connecting the pipes 110 and 112 to the supports 114 so that the manifold 106 can be bodily removed from the inlet chamber 26 if desired, and for this purpose a union-type coupling 120 is provided to connect the manifold 106 with the short pipe or conduit 108. Each of the horizontal branches 110 an 112 supplies scrubbing liquid to a plurality of short nipples 122 which have spray nozzles 124 at the outer end for directing finely divided or atomized droplets of the scrubbing liquid against the inlet side of the grid assemblies 100. The spacing and location of the nozzles 124 and the angle a pattern of spray discharge from the nozzles is adjusted to provide for full coverage of the grid assemblies and one or all of the nozzles can be shut off completely if desired. The scrubbing liquid (normally water) introduced into the gas flow on the inlet side of the grid assemblies 100 from the spray nozzles 124 and from the collecting trough 86 passes through the slots or passages between elements 101, and because of the extreme turbulence of the flow through the slots and adjacent the tubes 101 excellent blending and mixing of the small liquid droplets with the gas is achieved. This results in a better collection or agglomeration of the contaminant particles in the gas within the liquid droplets. Some of this scrubbing liquid introduce does not pass through the spaces between elements but instead flows on down the grid structure 28 on the inlet side and collects in the portion of the sump 38 the inlet chamber 26. Some of the liquid droplets that pass through the spaces or slots between elements 101 in the gas flow are likewise collected in the sump on the outlet chamber side and some of this liquid gravitates out of the gas flow as the gas begins to flow upwardly into the cylindrical housing section 54. The heavier liquid droplets which contain amounts of agglomerated contaminants fall onto the sloping bottom wall 36b and run down into the sump 38 on the outlet chamber side of the grid structure and the contaminated scrubbing liquid which is collected in the sump 38 on both sides of the grid structure 28 is carried away by a pair of drainpipes 126 and 128 leading to the sewer or to a sludge treatment tank or other reconditioning system (not shown) wherein the contaminants are removed from the scrubbing liquid, which can then be reintroduced into the scrubber 20 via the inlet line 108 connected to the manifold 106.

A liquid seal in the sump 38 is maintained so that no backflow of gases between the inlet chamber 26 and the outlet chamber 32 occurs and by means well known to those skilled in the art, such as a float valve or an overflow weir, a level of liquid is maintained in the sump above the outlets connected to the drain lines 126 and 128. Because the total or collective area of all of the slots or passages in the grid assemblies 100 through which the gases and scrubbing liquid are flowing is considerably less than the total transverse cross-sectional area across the lower housing section 30, the fluid velocity through each individual passage or slot is much greater than the average flow velocity in the housing. Because of this increased gas flow velocity, the small liquid droplets supplied by the spray nozzle 124 and the liquid film or droplets dispensed onto the inlet side of the grid structure from the channel trough 86 are literally torn apart into smaller droplets, and this tearing action results in a better blending or marriage of the liquid droplets with the smaller contaminant particles contained in the gas flow even including particles of less than 1 micro in size. Moreover, because of the extreme turbulence of the gas flow in the region adjacent slots or passages between grid elements 101, excellent mixing of the scrubbing liquid and gas is obtained so that the larger contaminant particles in the gas are more readily collected and agglomerated within the liquid droplets. These liquid droplets grow in size and, as the contaminants agglomerate therein, become heavy and gravitate out onto the sloped bottom wall 36b of the outlet chamber 32 as the gases flow upwardly into the lower end of the cylindrical housing section 54.

Most of the heavier and larger liquid droplets which contain large amounts of agglomerated contaminants, gravitate out of the gas stream in the lower chamber 30, and by the time the gas starts to flow upwardly in the lower portion of the cylindrical housing section 54, only the smaller droplets of liquid which are light enough to be carried upwardly by the buoyant force of the gas flow are still present. It is desirable that these droplets carried along in upwardly moving gas streams, sometimes called "mist", be removed from the gas before discharge through the outlet fitting 60, and in order to remove these small droplets, or "demist" the gas, the scrubber 20 includes a rotary demisting vane assembly 130 which is generally similar to the demisting vane assembly shown in United States Pat. No. 3,348,364.

Briefly, the assembly 130 is mounted in the lower portion of the cylindrical housing section 54 and includes an inner, cylindrical, vane support ring 132 and an outer ring 134 spaced in concentric relation therewith. The spaced support rings define an annular gas flow passage 136, and the outer ring forms the inside wall of an annular, liquid collecting trough 138 having an outer wall formed by the inside surface of the housing 54. The liquid trough includes an annular bottom wall 140 of ringlike configuration, and in the central portion of the vane assembly, a circular wall 142 is provided to block the gas flow through the inner ring 132. The central portion of the vane assembly 130 is supported by a leg 144 mounted on a diametrical strut 146 having opposite ends secured to the inside surface of the housing wall.

The concentric rings 132 and 134 support opposite ends of a plurality of generally radially extending individual swirl vanes 148 which are sloped in relation to the horizontal and which are supported from the rings with mounting pins 150 which project from opposite ends thereof. As shown in FIG. 2, the pins 150 are mounted on small angle brackets 152 secured to the underside of the vanes, and the pins project into circumferentially spaced apertures formed in the rings 132 and 134. Each vane is formed with a lower leading edge portion 148a, a middle portion 148b, and an outlet or discharge upper edge portion 148c, and these portions angularly intersect one another, thereby adding strength of stiffness to the vanes and providing for a gradual transition of the flow direction of the gases from vertical toward horizontal. By initiating a horizontal component to the direction of the gases flowing through the vane assembly 130, the gas is centrifuged radially outwardly at high velocity towards the inside wall surface of the cylindrical housing section 54 in a plurality of upwardly spiraling streams. As best indicated in FIG. 2, the lower or inlet portions 148a of the vanes have a relatively steep slope in relation to the horizontal, while the outlet portions 148c have a relatively shallow slope in relation to the horizontal. The flow area 136 between the rings 132 and 134 is considerably less than the cross-sectional area of the chamber 54, and the gas flow is at an increased velocity between the vanes 148 in the vane assembly 130.

Figure 7:
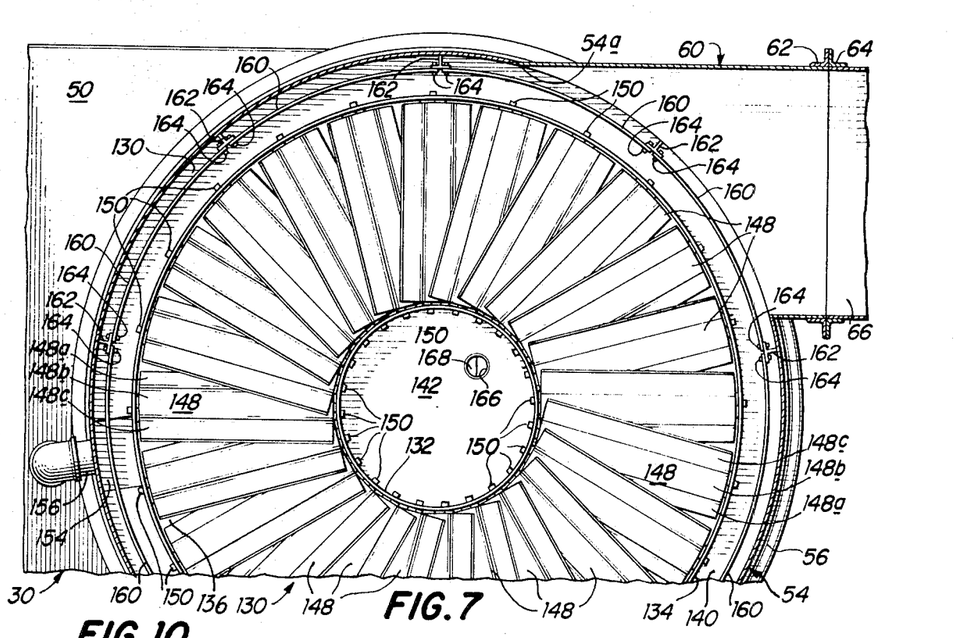
FIG. 7 is a horizontal sectional view taken substantially along line 7-7 of FIG. 2.

The high-velocity gas moving through the vane assembly 130 is centrifuged radially outwardly toward the wall of the chamber 54 and flows in a generally spiral path upwardly and eventually out of the scrubber through the outlet fitting 60. The vanes 148 are adjustable in angular relation with the horizontal in order to provide for the most efficient swirling action consistent with the lowest possible pressure loss through the vane assembly. Because the liquid mist or finely divided droplets of scrubbing liquid contained in the gas are relatively heavier than the gas molecules themselves, the liquid droplets are centrifuged outwardly with greater force than the gas. These liquid droplets impinge and collect on the inside surface of the housing section 54 and then flow downwardly into the annular, liquid-collecting trough 138. The trough is provided with a sump 154 which is connected through a drain line 156 having a union coupling 158 therein to the channel-shaped trough 86 along the upper edge of the grid structure 28 in the lower housing section 30. As best shown in FIGS. 2 and 5, the lower end of the conduit 156 projects into the housing section 30 through an opening in the top wall 50, and the lower end of the conduit is spaced below the upper edge of the weir or short flange 86b of the channel 86 so that a liquid seal is continuously maintained between the inlet chamber 26 and the demist section of the scrubber in the housing 54 above the vane assembly 130. As best shown in FIGS. 7 and 8, the sump 154 is slightly off center of the longitudinal axis of the lower section 30 of the housing so that the support rib 146 is not interfered with.

The liquid mist is separated from the gas by centrifugal action and impinges against the inside surface of the cylindrical housing section 54. Liquid droplets collect and flow down the housing wall into the collecting trough 138 for delivery into the lower collecting trough 86 whereby a liquid seal is maintained between the inlet chamber 26 and the housing section 54 so that there is no backflow of gases.

In order to better separate the liquid mist from the gas a plurality of perforated plates 160, each of which conforms to a longitudinal segment of a cylinder, are mounted inside the cylindrical housing section 54 above the liquid collecting trough 138 ad spaced inwardly of the housing wall surface. The perforated plates 160 assemble together into a perforated cylinder or cagelike structure which is in concentric alignment with the outer, cylindrical wall of the housing section 54 and is spaced inwardly thereof a distance D. Each perforated plate 160 is removably mounted on a pair of vertically extending, parallel spaced-apart T members 162 with a middle flange welded or otherwise secured to the inside surface of the cylindrical housing wall section 54. The perforate plates are attached to the lateral flanges of the T members 162 with bolts 164 or other fasteners so that the individual perforated plates may be removed for cleaning or replacement on an individual basis.

The number, size, and pattern of perforations in the perforated plates 160 are arranged to readily permit the outward flow of mist droplets while at the same time presenting a false wall or liner for the gases. The liquid droplets are centrifuged outwardly through the perforations in the plates 160 and are then partially hidden from the action of the gas streams spiraling upwardly in the housing.

A common problem encountered with prior rotary vane-type demisting assemblies of the general type disclosed herein is that as the water droplets are centrifuged outwardly and collected on the surface of the housing wall, sometimes the droplets (instead of moving downwardly and collecting in the liquid tough) migrate upwardly under the influence of the upwardly spiraling gas stream and eventually this moisture is recombined with gas and is carried out through the exhaust outlet. Thus the separation efficiency of the demist vane assembly is reduced and the gas leaving the scrubber often contains moisture. much moisture The perforated wall sections 160 of the present invention provide a false wall which tends to hide the water droplets from the effect of the upwardly spiraling gas stream, and the droplets then collect and run freely down the outer housing wall 54 into the annular collecting trough 138 with little recombination of the droplets with the gas. It has been found that the perforated cylindrical structure formed by the perforated plates 160 greatly improves the efficiency of the demisting vane assembly 130 in centrifuging out the liquid mist contained in the gas.

Some liquid collects in the central portion of the housing above the circular wall 142 within the inner support ring 132 and a short drainpipe 166 with a collapsible, rubber, sock-type valve member 168 on the lower end is provided for removing this liquid and dispensing the liquid downwardly into the lower section 30 of the scrubber housing in a large enough stream or quantity so that the liquid is not carried back upwardly by the buoyancy of the gas stream. The sock-type valve 168 functions to open after a sufficient amount of liquid is collected and a corresponding head of water pressure is applied, and the valve 168 opens periodically to drain out the collected liquid from above the vane assembly 130. The valve 168 prevents backflow of gas or leakage of gas pressure between the inlet and outlet side of the demisting vane assembly 130.

Figure 10:
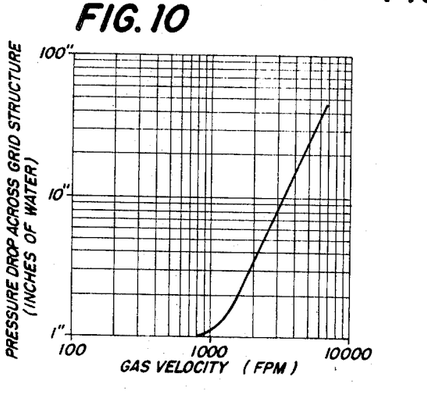
FIG. 10 is a graphical representation of the operating characteristics of a gas scrubber in accordance with the present invention showing the correlation between the velocity of the gas flow through the grid structure and the pressure loss between opposite sides.

The graphical representation of FIG. 10 indicates the correlation between the pressure drop across the curtain grid structure 28 and the gas velocity between the spaced grid elements 101. It will be seen that a gas velocity of approximately 3,500 feet per minute produces about a 10-inch drop across the plate.

Figure 11:
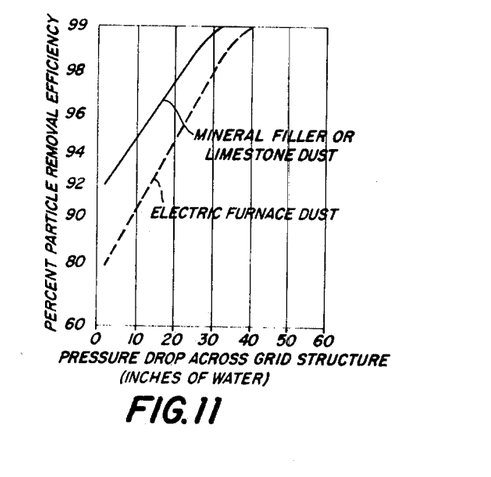
FIG. 11 is a graphical representation of the characteristics of a gas scrubber in accordance with the present invention showing the correlation between the pressure loss across the grid structure and the contaminant-particle-removal efficiency for two different kinds of contaminants.

FIG. 11 is a graphical representation illustrating the correlation between the pressure drop across the grid structure and contaminant-particle-removal efficiency for two typical types of contaminants. As can be seen, the mineral filer and limestone dust are much easier to remove than the electric furnace dust and approximately 98 percent of the particles of the former can be removed in the scrubber 20 with an operating pressure loss of about 25 inches of water. To remove the same percentage of electric furnace dust, however, a pressure drop of approximately 33 inches of water across the grid structure is required, with a correspondingly greater power required for operation of the scrubber. By regulating the size, spacing, and pattern of the grid elements 101 or passages or spaces therebetween in the grid assemblies 100 and by setting up the proper number of grid assemblies 100 in relation to the number of blocking plates 102 on the structure 28, the operating pressure drop can be controlled to provide the desired gas velocity needed to achieve a high collection efficiency.

Figure 12:
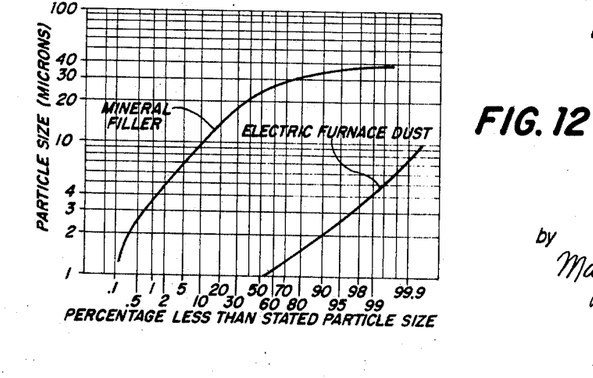
FIG. 12 is a graphical representation illustrating the range of particle size and percentages thereof in two different kinds of industrial gases.

FIG. 12 is a graphical representation illustrating a typical distribution of particles according to size in two different contaminants, namely, mineral filler and electric furnace dust, both of which are relatively difficult to remove from gas. The ordinate of the graph shows the particles size in microns and the abscissa indicated the percentage of particles less than the stated particle size. It can be seen from the graph that electric furnace dust is relatively fine, and approximately 90 percent of the particles are less than 2 microns in size. In mineral filer, only about 10 percent of the particles are smaller than 10 microns and, hence, electric furnace dust is much finer and correspondingly more difficult to collect in the scrubber. However, FIG. 11 indicates that the gas scrubber 20 does an excellent job of removing electric furnace dust at a relatively low pressure drop and, hence, in an economic fashion.

From the foregoing, it will be seen that the gas scrubber 20 of the present invention is readily adapted for use in efficient collection and removal of contaminant particles, such as electric furnace dust and the like. The particles of electric furnace dust are relatively small in size, and coarser material, such as mineral filler and limestone dust, is also removed in a highly efficient manner in he scrubber 20. Different combinations and numbers of grid assembles 100 and blocking plates 102 and different sized, gas flow passages or slots between the grid elements 101 in each grid assembly can be used on the wall structure 28 to provide the most advantageous and efficient operation of the gas scrubber for the particular contaminant material present in the gas. The cleansed gases leaving the scrubber are purified of a high percentage of contaminants, and almost all of the water or scrubbing liquid introduced into the gas during the scrubbing process is removed by the improved demisting vane assembly 130 and perforated wall plates 160.

The gas scrubber 20 of the present invention is highly efficient in operation. The liquid seal formed by the liquid in the channel trough 86 across the top edge of the grid structure 28 and the lower liquid seal formed by the liquid in sump 38 along the bottom of the grid structure prevent backflow of gases between the inlet chamber 26 and outlet chamber 36 in the housing. The liquid in trough 86 establishes a liquid seal between the region downstream of the demisting vane assembly 130 in the cylindrical housing section 54 and the inlet chamber 26 and, accordingly, no backflow of gas can take place between these regions. Because of the unique combination of the grid structure 28, the demisting vane assembly 130 and the perforated inner cylinder formed by the plates 160 additional filter beds and other filtering media are not required, and a high efficiency at a relatively low pressure loss through the scrubber is achieved.

What I claim as new and desire to be secured by Letters Patent of the United States is:

1. A gas scrubber comprising a housing having an inlet and an outlet for gas, a support frame structure transversely dividing said housing between said inlet and outlet comprising pairs of parallel frame members extending transversely of one another and forming a plurality of open spaces on said structure, at least one grid member removably mounted on said structure over one of said open spaces, said grid member including means defining a plurality of flow passages of reduced cross section for directing high-velocity gas flow through said structure, removable blocking plate means for covering said open spaces on said structure not covered with a grid member, wetting means for introducing a contaminant-collecting liquid into said gas for intimate mixing therewith in said high-velocity flow passages, and separator means for removing contaminated liquid from said gas downstream of said grid member.

2. The gas scrubber of claim 1 including liquid seal means between said inlet and outlet side of said support frame structure.

3. The gas scrubber of claim 2 wherein said support frame structure is upright and said liquid seal means includes an upper seal adjacent the upper edge of said structure and a lower seal comprising a sump formed in said housing adjacent the lower end of said structure.

4. The gas scrubber of claim 1 wherein said wetting means includes a liquid-collecting trough along the upper edge of said support frame structure for dispensing liquid onto said inlet side thereof.

5. The gas scrubber of claim 4 wherein said separator means includes a liquid collector in communication with said trough for supplying liquid to the same.

6. The gas scrubber of claim 1 including a plurality of said grid members removably mounted on said open spaces, and at least one blocking plate removably mounted on said frame structure to cover at least another of said open spaces.

7. The gas scrubber of claim 6 wherein said wetting means includes liquid spray means for dispensing finely divided liquid onto the inlet side of said support frame structure.

8. The gas scrubber of claim 1 wherein said separator means includes a centrifugal vane assembly for directing wetted gases radially outwardly of a vertical axis, a cylindrical outer housing wall in concentric relation with said axis for collecting liquid droplets impinging thereon, annular trough means adjacent a lower end of said outer wall, and a perforated cylindrical wall, spaced inwardly of said outer wall and in concentric relation with said axis.

9. The gas scrubber of claim 8 wherein said vane assembly includes a plurality of spaced-apart, generally radially extending vanes in annular array between inner and outer concentric support rings, said vanes sloped in relation to the horizontal and angularly adjustable in relation thereto, said annular trough means being formed between said outer wall and said outer support ring of said vane assembly.

10. The gas scrubber of claim 9 wherein said perforated wall is spaced between said outer wall and said inner ring of said vane assembly.

11. The gas scrubber of claim 8 wherein said trough means includes an inner wall comprising a cylindrical ring supporting the outer ends of a plurality of sloped, radially outwardly extending spaced-apart vanes of said vane assembly.

12. The gas scrubber of claim 11 wherein said vane assembly includes an inner cylindrical ring for supporting the inner ends of said vanes, and wall means across said inner ring for dividing said housing section above and below said vane assembly, and valve means in said wall means opening intermittently for discharging collected liquid into said housing section below said wall means.

13. The gas scrubber of claim 11 wherein said perforated inner wall is spaced outwardly of said cylindrical ring and the lower end is spaced above said trough means for dispensing liquid collected thereon into said trough means.

14. The gas scrubber of claim 8 wherein said perforated cylindrical wall is formed of a plurality of removable segments, each being supported along opposite vertical edges in spaced inward relation to said cylindrical housing section.

15. The gas scrubber of claim 8 including a horizontally extending housing portion below and in communication with the lower end of said cylindrical housing section; said support frame structure extended vertically transversely in said horizontal housing portion dividing the same into an inlet chamber and an outlet chamber in communication with said cylindrical housing section.

16. The gas scrubber of claim 15 including liquid seal means between said annular collecting trough and said inlet chamber of said housing.

17. The gas scrubber of claim 16 including sump means in said horizontal housing portion on opposite sides of said support frame structure forming liquid seal means between said inlet and outlet chambers.

18. The gas scrubber of claim 16 wherein said liquid seal means includes an elongated liquid-collecting trough along the upper edge of said support frame, said trough including overflow means for dispensing collected liquid to flow downwardly onto said support frame structure in said inlet chamber.

19. The gas scrubber of claim 18 including liquid spray means in said inlet chamber for introducing liquid into said gas passing from said inlet to said outlet chamber.